United States Patent
Fujino et al.

(10) Patent No.: US 11,082,650 B1
(45) Date of Patent: Aug. 3, 2021

(54) IMAGE CAPTURING DEVICE AND LINE VARIATION NOISE REDUCTION DEVICE

(71) Applicant: Mitsubishi Electric Corporation, Tokyo (JP)

(72) Inventors: Toshiki Fujino, Tokyo (JP); Kohei Kurihara, Tokyo (JP); Koichi Yamashita, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/734,993

(22) PCT Filed: Jun. 29, 2018

(86) PCT No.: PCT/JP2018/024779
§ 371 (c)(1),
(2) Date: Dec. 3, 2020

(87) PCT Pub. No.: WO2020/003488
PCT Pub. Date: Jan. 2, 2020

(51) Int. Cl.
*H04N 5/365* (2011.01)
(52) U.S. Cl.
CPC .................. *H04N 5/3658* (2013.01)
(58) Field of Classification Search
None
See application file for complete search history.

(56) References Cited

U.S. PATENT DOCUMENTS 10,277,846 B2 * 4/2019 Asaba .................... H04N 5/374
11,019,293 B2 * 5/2021 Asaba .................. H04N 5/3575
2003/0099410 A1 * 5/2003 Daigi .................... G06T 3/4007
   382/298
2011/0019039 A1 * 1/2011 Ikuma .................. H04N 5/3658
   348/246
2018/0098009 A1  4/2018 Furuta

FOREIGN PATENT DOCUMENTS

JP       4749397 B2     8/2011
JP       6275334 B2     2/2018

OTHER PUBLICATIONS

International Search Report and Written Opinion dated Aug. 21, 2018, received for PCT Application No. PCT/JP2018/024779, Filed on Jun. 29, 2018, 9 pages including English Translation.

* cited by examiner

*Primary Examiner* — James M Hannett
(74) *Attorney, Agent, or Firm* — Xsensus LLP

(57) ABSTRACT

An image capturing device includes an image sensor and processing circuitry. The processing circuitry calculates a pixel value fluctuation amount as a fluctuation amount of each of the pixel values; calculates a line fluctuation amount as an average value of N pixel value fluctuation amounts of N pixels; calculates a variance value of the N pixel value fluctuation amounts from the N pixel value fluctuation amounts and the line fluctuation amount; calculates a movement adaptive weight based on the variance value; calculates a line fluctuation noise correction amount, corresponding to each of the pixel values outputted from the image sensor, from the line fluctuation amount and the movement adaptive weight; and corrects each of the pixel values outputted from the image sensor by using the line fluctuation noise correction amount and thereby generates an image signal after the correction.

15 Claims, 8 Drawing Sheets

☐ PARTIAL LINE (N = 16 PIXELS)
⊛ CENTRAL PIXEL OF PARTIAL LINE
• EFFECTIVE PIXEL

☐ PARTIAL LINE (N = 16 PIXELS)
⊛ CENTRAL PIXEL OF PARTIAL LINE
• EFFECTIVE PIXEL

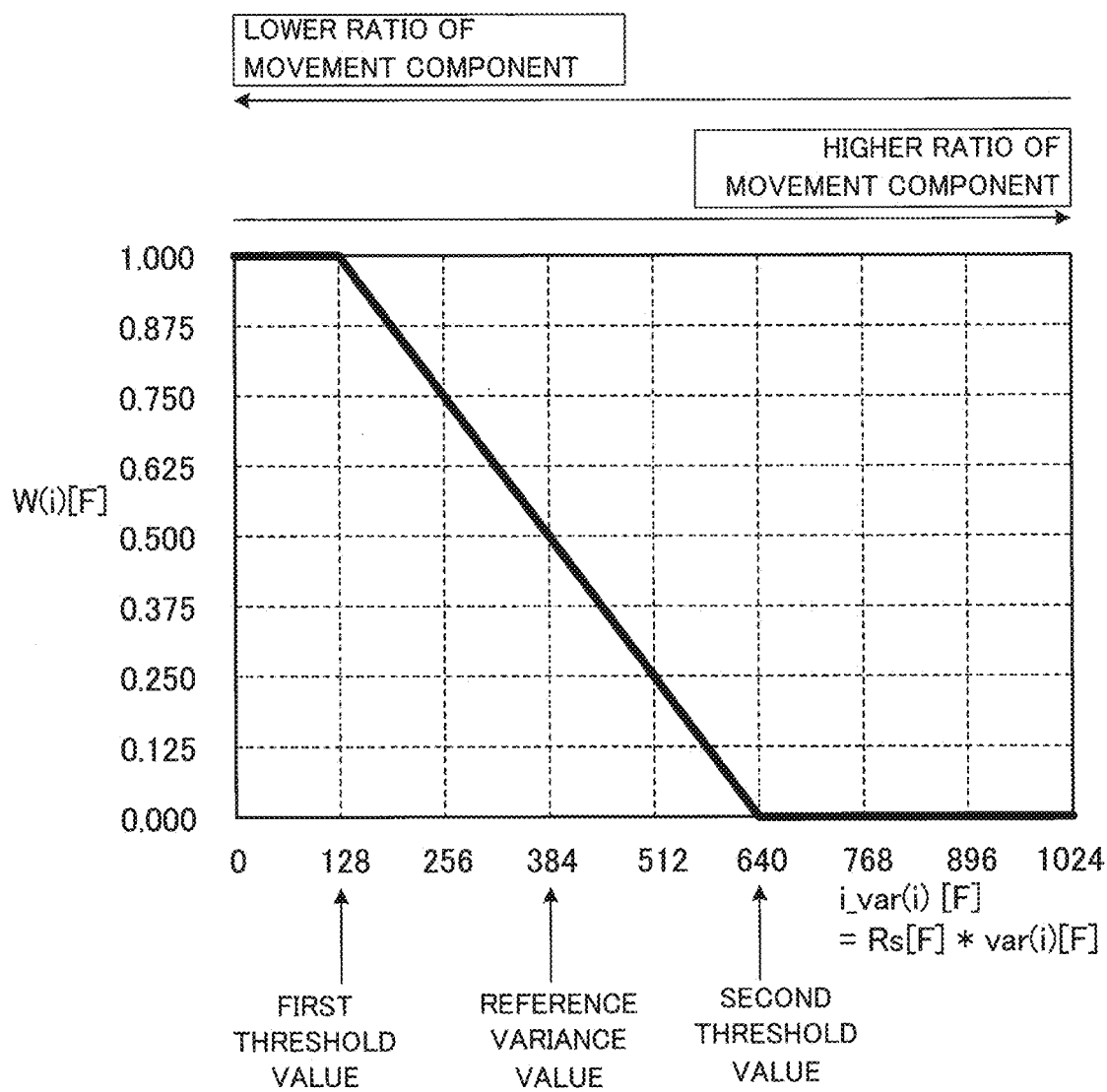

IMAGE CAPTURING DEVICE AND LINE VARIATION NOISE REDUCTION DEVICE

CROSS-REFERENCE TO RELATED APPLICATION

The present application is based on PCT filing PCT/JP2018/024779, filed Jun. 29, 2018, the entire contents of which are incorporated herein by reference.

TECHNICAL FIELD

The present invention relates to an image capturing device and a line fluctuation noise reduction device.

BACKGROUND ART

An image pickup device (e.g., image sensor) captures an image of a subject by using a plurality of detection elements arranged two-dimensionally and thereby successively outputs pixel values of a plurality of pixels corresponding to the plurality of detection elements as an image signal. This image signal can contain line fluctuation noise as level fluctuation in the pixel values of each horizontal scan line due to a noise component in each horizontal scan line (see Patent Reference 1, for example).

The line fluctuation noise causes flicker in the image and lowers visibility of the image. As a method for suppressing the line fluctuation noise, there is a method of correcting the image signal so that the average value of the pixel values in each horizontal scan line in the image signal becomes constant. In this method, the difference between the average value of the pixel values of all pixels in one horizontal scan line and the average value of the pixel values of all pixels in the same horizontal scan line in a frame one frame earlier, or a line fluctuation value as the average value of the difference between the pixel value of each pixel in one horizontal scan line and the pixel value of the same pixel in the same horizontal scan line in a frame one frame earlier, is used as a correction value.

PRIOR ART REFERENCE

Patent Reference

Patent Reference 1: Japanese Patent No. 4749397

SUMMARY OF THE INVENTION

Problem to be Solved by the Invention

However, the line fluctuation value calculated when the subject includes a moving part contains a movement component as a fluctuation component not due to the noise component in each horizontal scan line, namely, as a fluctuation component due to the moving part. Accordingly, there is a problem in that the line fluctuation noise cannot be reduced appropriately if the image signal is corrected by using the line fluctuation value as the correction value.

An object of the present invention, which has been made to resolve the above-described problem with the conventional technology, is to provide an image capturing device capable of appropriately reducing the line fluctuation noise even when a moving part is included in the subject and a line fluctuation noise reduction device capable of appropriately reducing the line fluctuation noise even when a moving part is included in a detection target.

Means for Solving the Problem

An image capturing device according to an aspect of the present invention includes: an image capturing unit that includes a plurality of detection elements arranged two-dimensionally in a horizontal scan direction and a vertical direction, captures an image of a subject, and thereby outputs pixel values of a plurality of pixels corresponding to the plurality of detection elements; a pixel value fluctuation amount calculation unit that calculates a pixel value fluctuation amount as a fluctuation amount of each of the pixel values in a time direction; a line fluctuation amount calculation unit that calculates a line fluctuation amount as an average value of N pixel value fluctuation amounts of N pixels in a partial line where N is an integer smaller than a total number of pixels in a horizontal scan line and the partial line is a range of N consecutive pixels in the horizontal scan line; a variance value calculation unit that calculates a variance value of the N pixel value fluctuation amounts from the N pixel value fluctuation amounts and the line fluctuation amount; a movement adaptive weight determination unit that calculates a movement adaptive weight based on the variance value; a correction amount calculation unit that calculates a line fluctuation noise correction amount, corresponding to each of the pixel values outputted from the image capturing unit, from the line fluctuation amount and the movement adaptive weight; and a line fluctuation noise correction unit that corrects each of the pixel values outputted from the image capturing unit by using the line fluctuation noise correction amount and thereby generates an image signal after the correction.

A line fluctuation noise reduction device according to another aspect of the present invention is a device that receives a detection signal outputted from a detection unit including a plurality of detection elements arranged two-dimensionally in a horizontal scan direction and a vertical direction, detecting a physical quantity of a detection target, and thereby outputting detection values of a plurality of detection points corresponding to the plurality of detection elements, including: a detection value fluctuation amount calculation unit that calculates a detection value fluctuation amount as a fluctuation amount of each of the detection values in a time direction; a line fluctuation amount calculation unit that calculates a line fluctuation amount as an average value of N detection value fluctuation amounts of N detection points in a partial line where N is an integer smaller than a total number of detection points in a horizontal scan line and the partial line is a range of N consecutive detection points in the horizontal scan line; a variance value calculation unit that calculates a variance value of the N detection value fluctuation amounts from the N detection value fluctuation amounts and the line fluctuation amount; a movement adaptive weight determination unit that calculates a movement adaptive weight based on the variance value; a correction amount calculation unit that calculates a line fluctuation noise correction amount, corresponding to each of the detection values outputted from the detection unit, from the line fluctuation amount and the movement adaptive weight; and a line fluctuation noise correction unit that corrects each of the detection values outputted from the detection unit by using the line fluctuation noise correction amount and thereby generates the detection signal after the correction.

Effect of the Invention

With the image capturing device according to the present invention, even when a moving part is included in the subject, the line fluctuation noise can be reduced appropriately while inhibiting influence on the movement component of the image signal.

With the line fluctuation noise reduction device according to the present invention, even when a moving part is included in the detection target, the line fluctuation noise can be reduced appropriately while inhibiting influence on the movement component of the detection signal.

BRIEF DESCRIPTION OF THE DRAWINGS

FIG. 5 is a diagram showing a graph of a movement adaptive weight property when a standard reference variance value is 384.

MODE FOR CARRYING OJT THE INVENTION

Image capturing devices and line fluctuation noise reduction devices according to embodiments of the present invention will be described below with reference to the accompanying drawings. The following embodiments are just examples and a variety of modifications are possible within the scope of the present invention.

(1) First Embodiment (1-1) Main Configuration of First Embodiment

Figure 1:
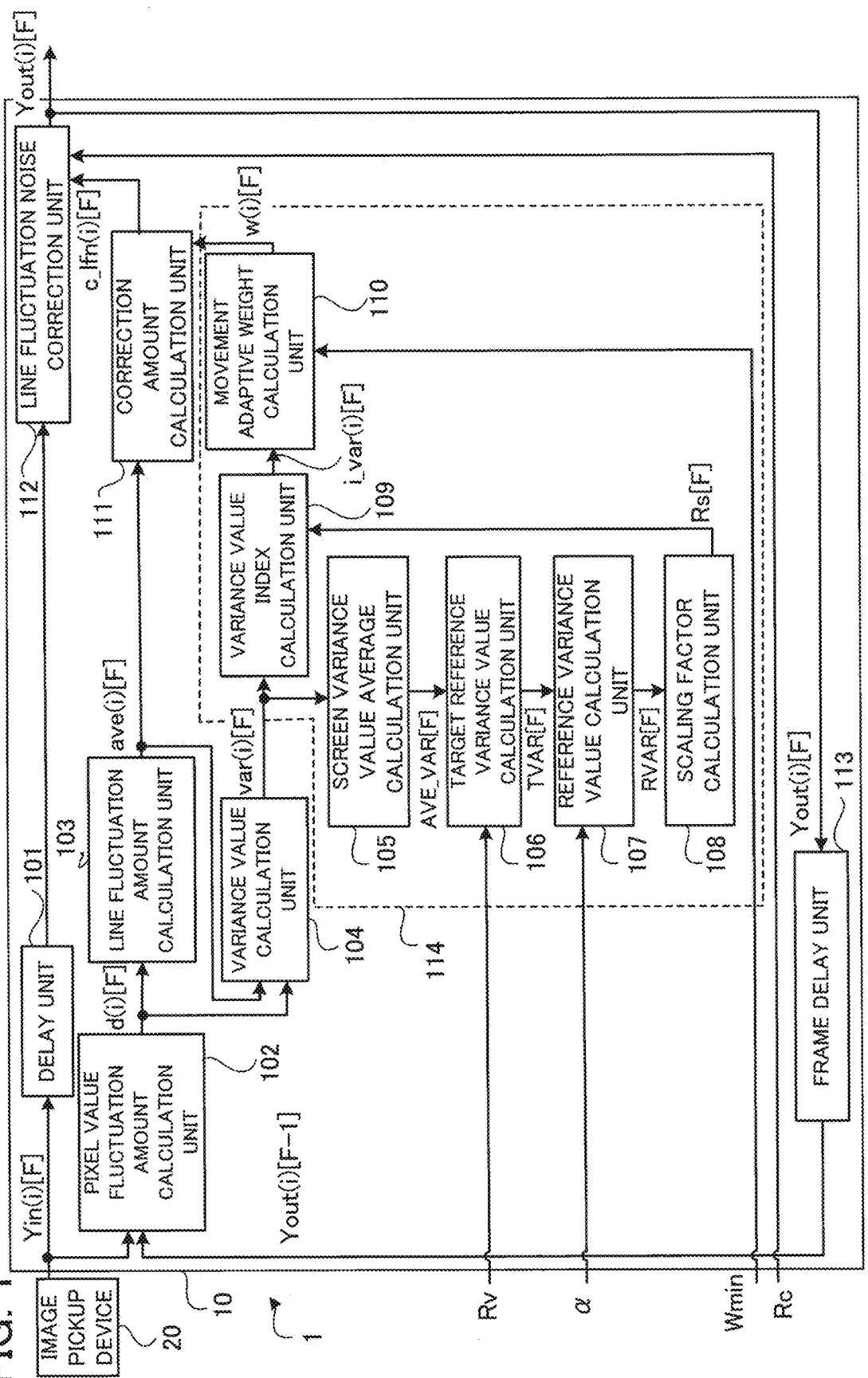
FIG. 1 is a block diagram schematically showing a configuration of an image capturing device according to a first embodiment of the present invention.

FIG. 1 is a block diagram schematically showing a configuration of an image capturing device 1 according to a first embodiment of the present invention. As shown in FIG. 1, the image capturing device 1 according to the first embodiment includes an image pickup device 20 as an image capturing unit and a line fluctuation noise reduction unit 10 as a line fluctuation noise reduction device.

The image pickup device 20 includes a plurality of detection elements arranged two-dimensionally in a horizontal scan direction and a vertical direction, captures an image of a subject by using the plurality of detection elements, and thereby outputs pixel values of a plurality of pixels corresponding to the plurality of detection elements as an image signal. The image signal is represented as Yin.

Each pixel value forming the image signal Yin is represented as Yin(i). Among the pixel values forming the image signal Yin, the pixel value of the i-th pixel in a frame that is the F-th (hereinafter referred to also as an "F-th frame") is represented as Yin(i)[F]. In the following description, i in round brackets ( ) is a positive integer indicating the number of a pixel in a certain frame. Further, F in square brackets is a positive integer indicating a frame number.

The line fluctuation noise reduction unit 10 is a signal processing circuit, for example. As shown in FIG. 1, the line fluctuation noise reduction unit 10 includes a delay unit 101, a pixel value fluctuation amount calculation unit 102, a line fluctuation amount calculation unit 103, a variance value calculation unit 104, a screen variance value average calculation unit 105, a target reference variance value calculation unit 106, a reference variance value calculation unit 107, a scaling factor calculation unit 108, a variance value index calculation unit 109, a movement adaptive weight calculation unit 110, a correction amount calculation unit 111, a line fluctuation noise correction unit 112 and a frame delay unit 113. The screen variance value average calculation unit 105, the target reference variance value calculation unit 106, the reference variance value calculation unit 107, the scaling factor calculation unit 108, the variance value index calculation unit 109 and the movement adaptive weight calculation unit 110 constitute a movement adaptive weight determination unit 114.

The pixel value fluctuation amount calculation unit 102 calculates a pixel value fluctuation amount d(i) as a fluctuation amount of each of the pixel values in a time direction. The pixel value fluctuation amount when the pixel value Yin(i)[F] of the i-th pixel in the F-th frame is inputted, i.e., the pixel value fluctuation amount corresponding to the pixel value of the i-th pixel in the F-th frame, is represented as d(i)[F].

Assuming that N is an integer smaller than a total pixel number L as the total number of pixels in a horizontal scan line and a partial line is a range of N consecutive pixels in the horizontal scan line, the line fluctuation amount calculation unit 103 calculates a line fluctuation amount ave(i) as the average value of N pixel value fluctuation amounts of the N pixels in the partial line. The line fluctuation amount corresponding to the pixel value of the i-th pixel in the F-th frame is represented as ave(i)[F]. Concrete examples of the partial line will be described later.

The variance value calculation unit 104 calculates a variance value var(i) of the N pixel value fluctuation amounts from the N pixel value fluctuation amounts of the N pixels in the partial line and the line fluctuation amount. The variance value var(i) of the N pixel value fluctuation amounts calculated from the N pixel value fluctuation amounts of the N pixels in the F-th frame and the line fluctuation amount ave(i)[F] corresponding to the pixel value of the i-th pixel in the F-th frame is represented as var(i) [F].

The movement adaptive weight determination unit 114 calculates a movement adaptive weight w(i) based on the variance value var(i). The movement adaptive weight w(i) corresponding to the pixel value of the i-th pixel in the F-th frame is represented as w(i)[F]. In the first embodiment, the movement adaptive weight w(i)[F] takes on a small value when there is a lot of moving parts included in the subject, and the movement adaptive weight w(i)[F] takes on a large value when there is few moving parts included in the subject.

The correction amount calculation unit 111 calculates a line fluctuation noise correction amount c_lfn(i), corresponding to each of the pixel values outputted from the image capturing unit 20, from the line fluctuation amount ave(i) and the movement adaptive weight w(i). The line fluctuation noise correction amount corresponding to the pixel value of the i-th pixel in the F-th frame is represented as c_lfn(i)[F]. In the first embodiment, the line fluctuation noise correction amount c_lfn(i)[F] takes on a small value when there is a lot of moving parts included in the subject, and the line fluctuation noise correction amount c_lfn(i)[F] takes on a large value when there is few moving parts included in the subject.

The line fluctuation noise correction unit 112 corrects each of the pixel values Yin(i) outputted from the image capturing unit 20 by using the line fluctuation noise correction amount c_lfn(i) and thereby generates an image signal Yout(i) after the correction. The pixel value of the image signal after the correction corresponding to the pixel value of the i-th pixel in the F-th frame is represented as Yout(i)[F].

With the image capturing device 1 according to the first embodiment, the line fluctuation noise correction amount c_lfn(i)[F] takes on a small value when there is a lot of moving parts included in the subject, and the line fluctuation noise correction amount c_lfn(i)[F] takes on a large value when there is few moving parts included in the subject. Accordingly, when there is a lot of moving parts included in the subject, the movement component in the image signal is unlikely to be reduced. Further, when there is few moving parts included in the subject, the line fluctuation noise is reduced appropriately.

(1-2) Configuration and Operation of First Embodiment

The image pickup device 20 includes a plurality of detection elements having sensitivity in a predetermined wavelength range. The plurality of detection elements is arranged in multiple rows and columns on a two-dimensional plane. The image pickup device 20 performs the image capturing every predetermined frame period. The predetermined wavelength range is, for example, a wavelength range from 8 µm to 14 µm, namely, the infrared range. However, the predetermined wavelength range may also be a different wavelength range. The predetermined wavelength range can also be a wavelength range from 200 nm to 400 nm, namely, the ultraviolet range. In the first embodiment, a case where the predetermined wavelength range is the infrared range will be described.

Figure 2:
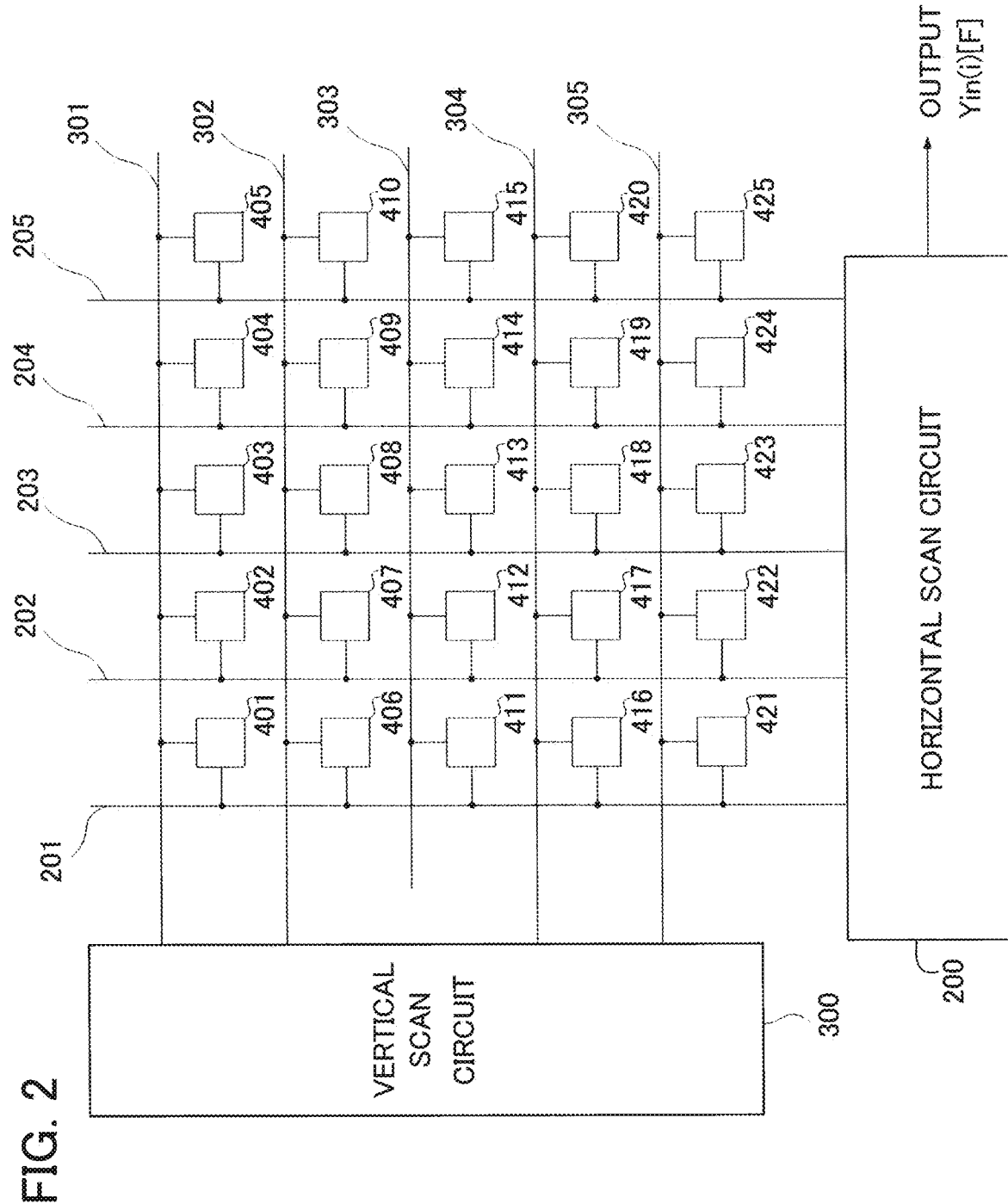
FIG. 2 is a diagram schematically showing a configuration example of the image pickup device of the image capturing device shown in FIG. 1.

FIG. 2 is a diagram schematically showing the configuration of the image pickup device 20 in FIG. 1. As shown in FIG. 2, in the image pickup device 20, a plurality of pixels (a plurality of detection elements) 401 to 425 are arranged in a row direction and a column direction like a matrix. Pixels of each row that are arrayed in the row direction (pixels 401, 402, 403, 404 and 405 in the case of the first row) are connected to a common drive wire (drive wire 301 in the case of the first row). Pixels of each column that are arrayed in the column direction (pixels 401, 406, 411, 416 and 421 in the case of the first column) are connected to a common signal wire (signal wire 201 in the case of the first column). The drive wires 301, 302, 303, 304 and 305 of the rows are successively driven (namely, supplied with a drive pulse) by a vertical scan circuit 300 as a vertical scan unit. While the drive wire 301, 302, 303, 304, 305 of each row is driven (i.e., in one horizontal scan period), signals (i.e., pixel values or detection values) of the pixels of the row (pixels 401, 402, 403, 404 and 405 in the case of the drive wire 301) are successively outputted via the signal wires 201, 202, 203, 204 and 205 and a horizontal scan circuit 200 as a horizontal scan unit. Incidentally, while pixels of five rows and five columns are shown in FIG. 2, the number of pixels of the image pickup device 20 is not limited to this example. The number of pixels of the image pickup device may be 240 rows by 320 columns, for example.

The image capturing device 1 may include a lens unit as an imaging optical system that forms an image of the subject on the image pickup device 20. The lens unit includes, for example, a lens set including one lens or a plurality of lenses. The lens unit may have a function of allowing a light component in a predetermined wavelength range to pass through. Light radiating from the subject is condensed by the lens unit and forms an image on the plurality of detection elements, i.e., the plurality of pixels, of the image pickup device 20. Each detection element of the image pickup device 20 outputs a signal having a value corresponding to the intensity of incident light (i.e., pixel value) as the image signal Yin. In the first embodiment, the image pickup device 20 outputs a plurality of pixel values in the order of the raster scan as the image signal Yin.

The delay unit 101 shown in FIG. 1 delays the pixel values Yin(i)[F] as the image signal Yin outputted from the image pickup device 20 by a delay time determined based on a line fluctuation noise correction process which will be described later.

The pixel value fluctuation amount calculation unit 102 obtains the pixel value fluctuation amount d(i) of the i-th pixel from the pixel value Yin(i)[F] of the i-th pixel in the F-th frame as the image signal Yin outputted from the image pickup device 20 and the pixel value Yout(i)[F−1] of the same pixel in a frame one frame earlier (i.e., (F−1)-th frame) as a line fluctuation noise correction signal. The F-th frame in this case is defined as a reference frame. Specifically, the pixel value fluctuation amount calculation unit 102 obtains the pixel value fluctuation amount d(i)[F] of the i-th pixel in the F-th frame by subtracting the pixel value Yout(i)[F−1] of the same i-th pixel in the (F−1)-th frame of the image signal Yout from the pixel value Yin(i)[F] of the i-th pixel in the F-th frame of the image signal Yin. This pixel value fluctuation amount d(i)[F] is calculated by using the following expression 1, for example:

$$d(i)[F]=Yin(i)[F]-Yout(i)[F-1] \qquad \text{expression 1}$$

For example, the pixel value fluctuation amount calculation unit 102 calculates the pixel value fluctuation amount d(5)[10] regarding the fifth pixel Yin(5)[10] in the tenth frame by subtracting the fifth pixel Yout(5)[9] of the line fluctuation noise correction signal Yout as the image signal of the ninth frame (i.e., one frame earlier than the tenth frame) from the fifth pixel Yin(5)[10] of the tenth frame of the image signal Yin outputted from the image pickup device 20.

The line fluctuation amount calculation unit 103 averages the pixel value fluctuation amounts d(i)[F] outputted from the pixel value fluctuation amount calculation unit 102 in the range of the partial line. Namely, the line fluctuation amount calculation unit 103 calculates the line fluctuation amount ave(i)[F] as the average value of the pixel values of the N pixels included in the range of the partial line.

Figure 3A:
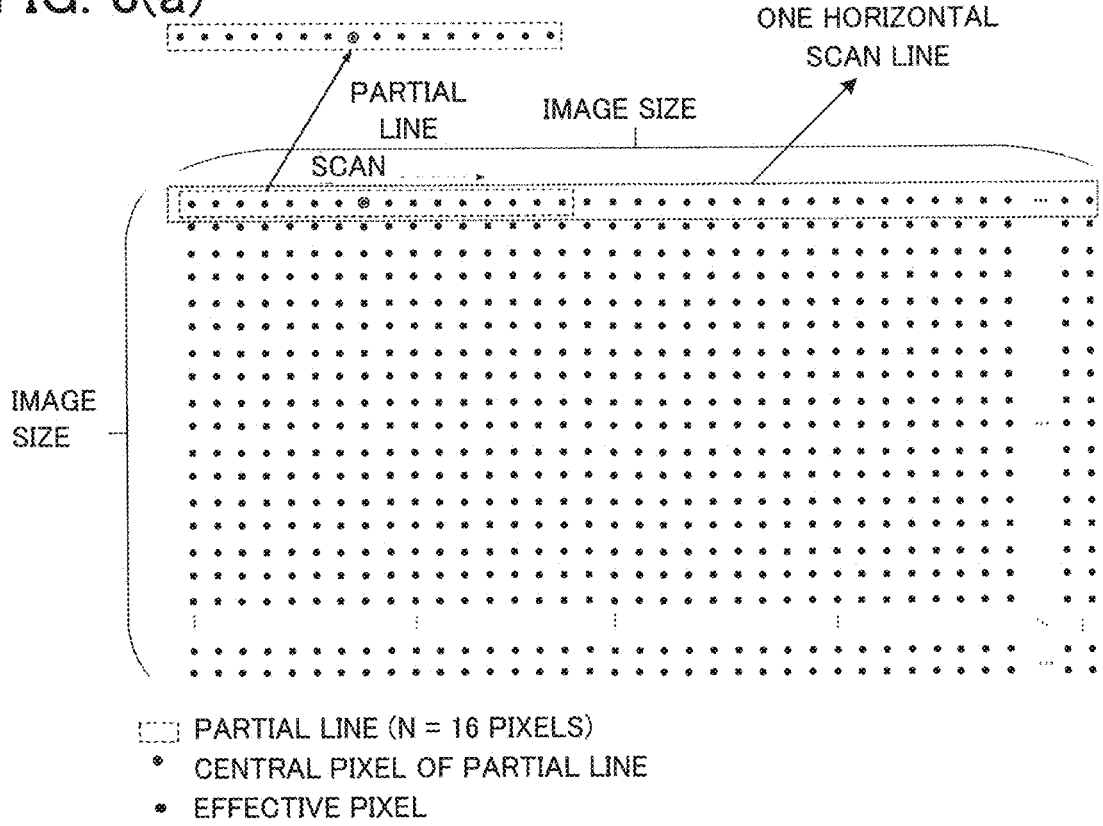
FIGS. 3(a) and 3(b) are diagrams showing an outline of a method of determining a range of a partial line by using a moving average method.
Figure 3B:
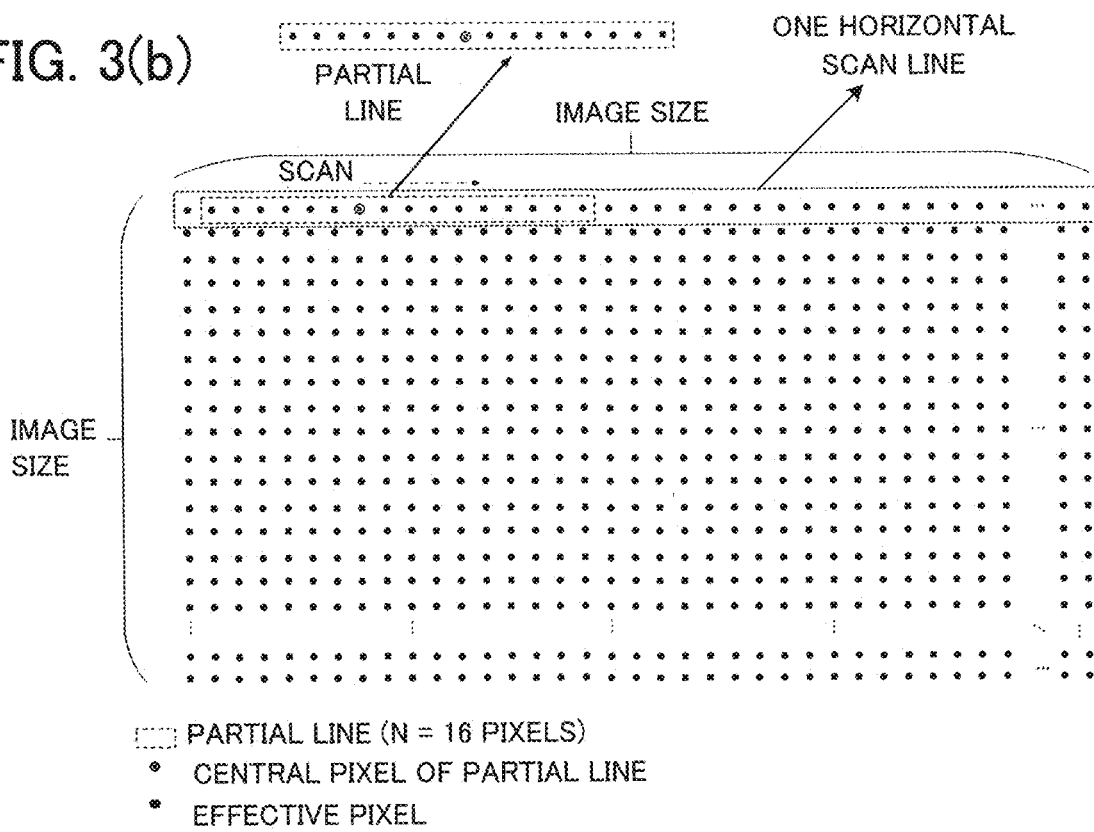

FIGS. 3(a) and 3(b) are diagrams showing an outline of a method of determining the range of the partial line by using a moving average method. In the moving average method, the line fluctuation amount ave(i)[F] is calculated in the range of the partial line while successively shifting the range of the partial line (i.e., the section of the partial line) by one pixel each time as shown in FIGS. 3(a) and 3(b).

Figure 4A:
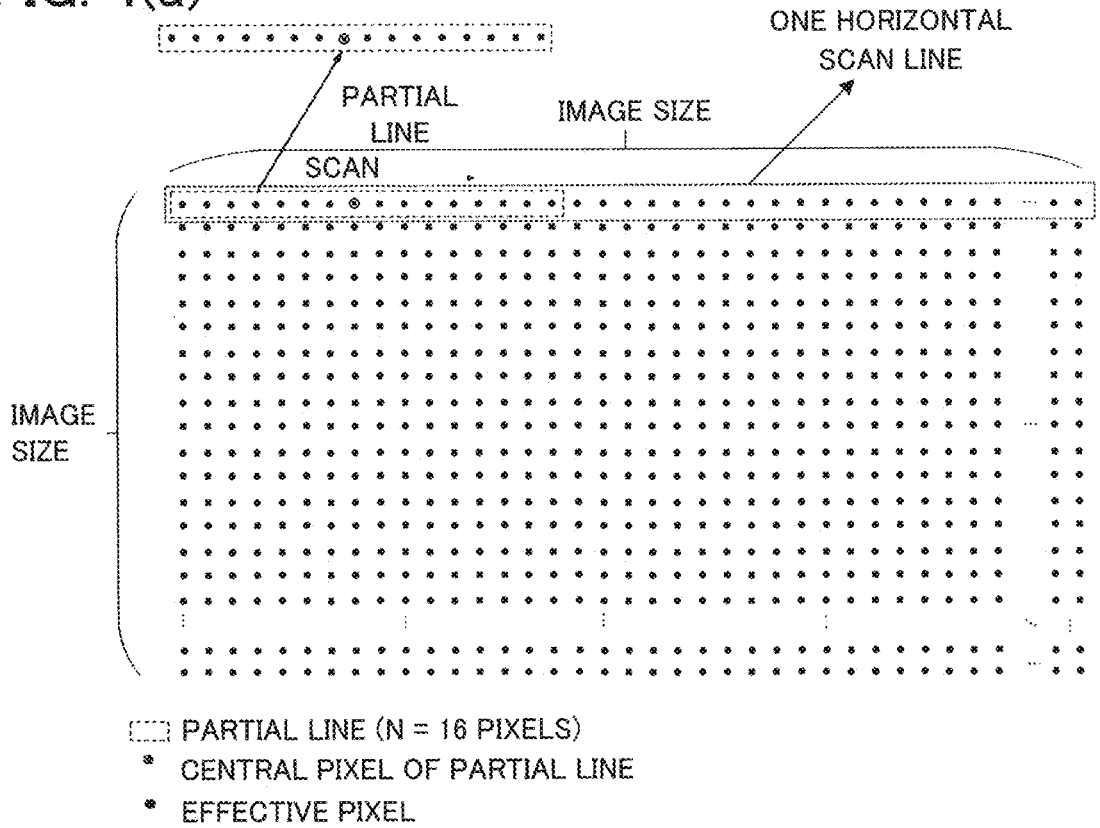
FIGS. 4(a) and 4(b) are diagrams showing an outline of a method of determining the range of the partial line by using a fixed partitioning method.
Figure 4B:
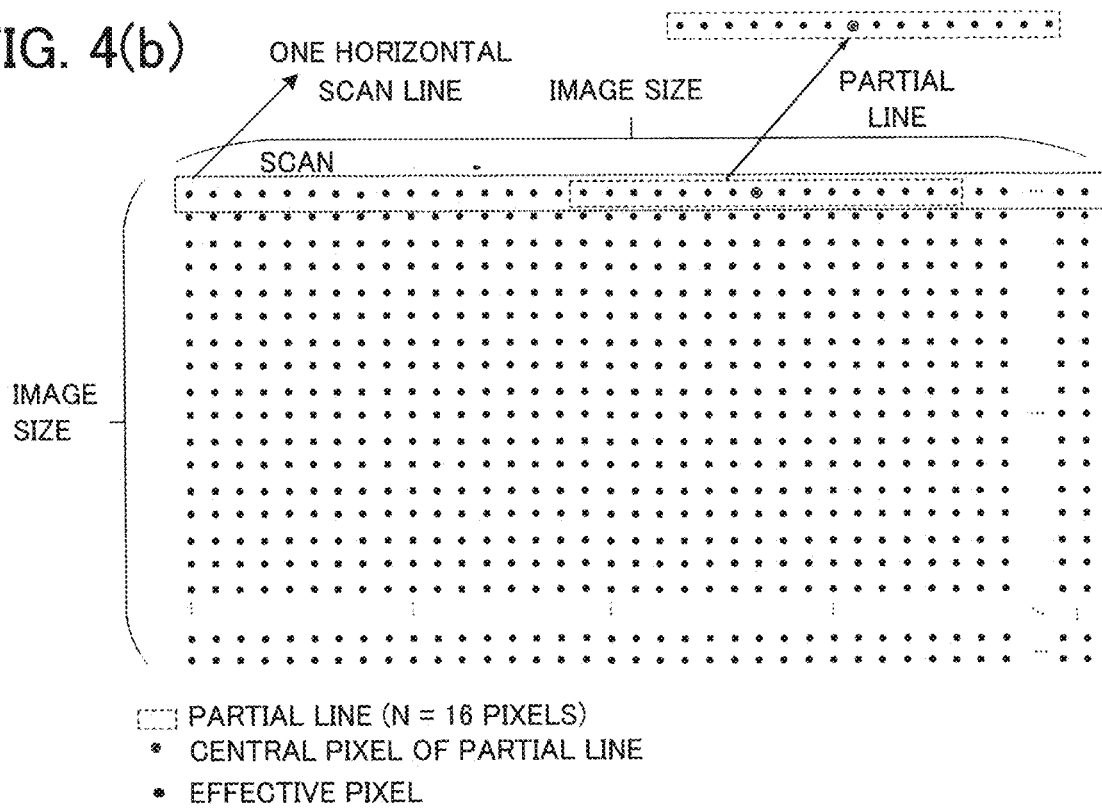

FIGS. 4(a) and 4(b) are diagrams showing an outline of a method of determining the range of the partial line by using a fixed partitioning method. In the fixed partitioning method, the line fluctuation amount ave(i)[F] is calculated in the range of the partial line while successively shifting the range of the partial line (i.e., the section of the partial line) by the number of pixels included in the partial line each time as shown in FIGS. 4(a) and 4 (b).

The range of the partial line, i.e., N as the number of pixels included in the partial line, is determined based on the width of the image size, that is, the number of pixels in one horizontal scan line. For example, when the number of pixels in one horizontal scan line is 320, N indicating the range of the partial line is 16 as $\frac{1}{20}$ of the number of pixels in one horizontal scan line. However, the number N of pixels included in the partial line may also be determined as a number other than 16 (e.g., 32 as $\frac{1}{10}$ of the number of pixels in one horizontal scan line, 64 as $\frac{1}{5}$ of the number of pixels in one horizontal scan line, etc.). As above, the number of pixels included in the partial line can be determined in the range from $\frac{1}{20}$ to $\frac{1}{5}$ of the number of pixels in one horizontal scan line. However, the number N of pixels included in the partial line can also be determined at a different number smaller than the number of pixels in one horizontal scan line. It is also possible to increase the range of the partial line with the increase in the image size. Alternatively, it is also possible not to change the range of the partial line even with the increase in the image size. It is also possible to appropriately determine the number of pixels included in the range of the partial line based on the angle of view and the number of pixels of the image capturing device 1, the size of the subject in the scene captured by the image capturing device 1, the distance to the subject, or the like.

When the moving average method is used, unnaturalness corresponding to movement of the subject hardly appears in the line fluctuation amount ave(i). However, the number of calculations increases when the moving average method is used. When the fixed partitioning method is used, a smoothing process is performed in the horizontal scan direction, by which unnaturalness at boundaries between adjacent partial lines can be made less noticeable. When the fixed partitioning method is used, the number of calculations can be reduced. When the fixed partitioning method is used, the circuit scale of the line fluctuation amount calculation unit 103 can be downsized compared to cases where the moving average method is used.

The line fluctuation amount calculation unit 103 may change the range of the partial line depending on the inputted image signal. For example, it is possible to set the number of pixels included in the range of the partial line at a small value (e.g., N=16 pixels) when there is a lot of moving parts in the inputted image, and set the number of pixels included in the range of the partial line at a large value (e.g., range of N=32 pixels) when there is few moving parts in the inputted image. The line fluctuation amount ave(i)[F] as the average value of the pixel values of the N pixels included in the range of the partial line is calculated by using the following expression 2, for example:

$$\text{ave}(i)[F] = \frac{1}{N} \sum_{j=1-(\frac{N}{2}-1)}^{i+\frac{N}{2}} d(j)[F]. \quad \text{expression 2}$$

The variance value calculation unit 104 calculates the variance value var(i)[F] of the partial line from the pixel value fluctuation amounts d(i)[F] outputted from the pixel value fluctuation amount calculation unit 102 and the line fluctuation amount ave(i)[F] outputted from the line fluctuation amount calculation unit 103. The variance value calculation unit 104 can obtain the variance value var(i)[F] as the root mean square of the differences from the average value. It is also possible for the variance value calculation unit 104 to first calculate the root mean square s_ave(i)[F] of the pixel value fluctuation amounts d(i)[F] in regard to the range of the partial line and then obtain the variance value var(i) [F] by subtracting (ave(i) [F])$^2$ as the square of the line fluctuation amount ave(i)[F] from the root mean square s_ave(i)[F]. The variance value var(i)[F] outputted from the variance value calculation unit 104 is calculated by using the following expression 3, for example:

$$\text{var}(i)[F] = \text{s\_ave}(i)[F] - (\text{ave}(i)[F])^2 \quad \text{expression 3}$$

$$\text{s\_ave}(i)[F] = \frac{1}{N} \sum_{k=1-(\frac{N}{2}-1)}^{i+\frac{N}{2}} (d(k)[F])^2$$

The screen variance value average calculation unit 105 calculates a screen variance value average AVE_VAR[F] of the F-th frame, as the average of the variance values of the partial lines in the whole screen, from the variance values var(i)[F] outputted from the variance value calculation unit 104. The screen variance value average AVE_VAR[F] of the F-th frame outputted from the screen variance value average calculation unit 105 is calculated by using the following expression 4, for example:

$$\text{AVE\_VAR}[F] = \frac{1}{M} \sum_{i=0}^{M} \text{var}(i)[F] \quad \text{expression 4}$$

$$= \frac{1}{320*240} \sum_{i=0}^{320*240} \text{var}(i)[F]$$

In the expression 4, M represents the total number of pixels in one frame. When one frame has 320 pixels horizontally and 240 pixels vertically, M equals 320×240 pixels. The screen variance value average AVE_VAR[F] is an index indicating the random noise level in the screen of the F-th frame including also the movement component.

The target reference variance value calculation unit 106 calculates a target reference variance value TVAR[F] by multiplying the variance value average AVE_VAR[F] of the screen outputted from the screen variance value average calculation unit 105 by a set value Rv that is used for adjusting threshold values (e.g., a first threshold value and a second threshold value shown in FIG. 5 which will be explained later) for discrimination between a moving object (i.e., dynamic object) and a stopped object (i.e., stationary object). Namely, the set value Rv is a value for adjusting the threshold values used for the discriminating between a moving object and a stationary object. The default value of the set value Rv is 1.0, for example. While the set value Rv may be inputted from the outside, the set value Rv may also be previously stored in a storage unit in the image capturing device 1. Letting TVAR[F] represent the target reference variance value in the F-th frame, the target reference variance value TVAR[F] outputted from the target reference variance value calculation unit 106 is calculated by using the following expression 5, for example: Incidentally, in cases where Rv=1, the movement adaptive weight determination unit 114 may also be configured without the target reference variance value calculation unit 106 so that the variance value average AVE_VAR[F] of the screen is supplied to the reference variance value calculation unit 107.

$$TVAR[F]=Rv*AVE\_VAR[F] \qquad \text{expression 5}$$

The reference variance value calculation unit 107 calculates a reference variance value RVAR[F], indicating threshold values used for discriminating between a moving object and a stationary object in regard to each screen, namely, each frame, from the target reference variance value TVAR[F] outputted from the target reference variance value calculation unit 106. RVAR[F] is the reference variance value in the F-th frame. By performing exponential smoothing on the reference variance value in the time direction, major fluctuations in the time direction can be restrained. Letting RVAR[F] represent the reference variance value in the F-th frame and RVAR[F−1] represent an already-acquired reference variance value in the (F−1)-th frame one frame earlier than the F-th frame, the reference variance value RVAR[F] outputted from the reference variance value calculation unit 107 is calculated by using the following expression 6, for example:

$$RVAR[F]=RVAR[F-1]*(1-\alpha)+TVAR[F]*\alpha \qquad \text{expression 6}$$

A ratio of the movement component increases (i.e., a ratio of movement judgments in which the pixel value of a pixel is judged to include the movement component increases) with the decrease in RVAR[F], and the ratio of the movement component decreases (i.e., the ratio of movement judgments in which the pixel value of a pixel is judged to include the movement component decreases) with the increase in RVAR[F]. Here, α represents an exponential smoothing coefficient. The default value of α is 0.25, for example. While α may be a value inputted from the outside, α may also be previously stored in the storage unit of the image capturing device 1.

FIG. 5 is a diagram showing a graph of a movement adaptive weight property when a standard reference variance value is 384. In order to use the standard movement adaptive weight property shown in FIG. 5, the scaling factor calculation unit 108 calculates a scaling factor Rs from a ratio between the predetermined standard reference variance value and the reference variance value RVAR[F] outputted from the reference variance value calculation unit 107. The scaling factor Rs[F] in the F-th frame outputted from the scaling factor calculation unit 108 is calculated by using the following expression 7, for example:

$$Rs[F]=\frac{\text{(Standard Reference Variance Value)}}{RVAR[F]}=\frac{384}{RVAR[F]} \qquad \text{expression 7}$$

The variance value index calculation unit 109 calculates a variance value index i_var(i)[F] by multiplying the variance value var(i)[F] calculated by the variance value calculation unit 104 by the scaling factor Rs[F] calculated by the scaling factor calculation unit 108. The variance value index i_var(i)[F] is an index used for the calculation of the movement adaptive weight w(i)[F] based on the standard movement adaptive weight property. The variance value index calculation unit 109 calculates the variance value index i_var(i)[F] in the F-th frame by using the following expression 8, for example:

$$i\_\text{Var}(i)[F]=Rs[F]*\text{Var}(i)[F] \qquad \text{expression 8}$$

The movement adaptive weight calculation unit 110 calculates a weight as a coefficient to be applied to each of a moving object and a stationary object, i.e., the movement adaptive weight w(i)[F], from the variance value index i_var(i)[F] outputted from the variance value index calculation unit 109. The variance value equals the amount of random noise in the image when only a stationary object exists and no moving object exists in the image, and the variance value equals "(random noise amount)+(movement amount)" when a moving object exists in the image. The movement adaptive weight calculation unit 110 controls the movement adaptive weight w(i)[F] by judging the movement amount based on the variance value. A variance value when the movement adaptive weight w(i) [F] equals 0.5 in a range 0.0 to 1.0 of the movement adaptive weight w(i)[F] is defined as the reference variance value of the threshold values used for discriminating between a moving object and a stationary object.

The range of the movement adaptive weight w(i)[F] is 0.0 to 1.0, for example. The image signal is not corrected when the value of the movement adaptive weight w(i)[F] is 0.0, and the image signal is corrected by directly using the line fluctuation amount when the value of the movement adaptive weight w(i)[F] is 1.0.

When the value of the movement adaptive weight w(i)[F] is between 0.0 and 1.0 (i.e., greater than 0.0 and less than 1.0), the movement adaptive weight w(i)[F] is changed linearly. FIG. 5 shows a graph of an example of the property of the movement adaptive weight w(i)[F]. The graph of the movement adaptive weight w(i)[F] may also be expressed by a quartic equation. The movement adaptive weight w(i) outputted from the movement adaptive weight calculation unit 110 is calculated by using the following expression 9, for example:

$$w(i)[F] = \begin{cases} 1.0 & (i\_\text{var}(i)[F] < 128) \\ 1.25 - \dfrac{i\_\text{var}(i)[F]}{512} & (128 \leq i\_\text{var}(i)[F] < 640) \\ 0.0 & (640 \leq i\_\text{var}(i)[F]) \end{cases} \qquad \text{expression 9}$$

Here, letting Wmin represent a minimum weight as the minimum value of the movement adaptive weight w(i)[F], it is possible to set saturation limitation with the minimum weight Wmin as w(i)[F]=Wmin. While the default value of the minimum weight Wmin is 0.0, for example, the default value may also be set at a value larger than 0.0.

The range of the movement adaptive weight may also be set as 0 to 100 instead of 0.0 to 1.0. However, since the value of the movement adaptive weight w(i) is used by the correction amount calculation unit 111, it is desirable to perform normalization so as to make it possible to multiply the image signal Yin[F] directly by the movement adaptive weight w(i).

The correction amount calculation unit 111 calculates the line fluctuation noise correction amount c_lfn(i)[F] by multiplying the movement adaptive weight w(i)[F] outputted from the movement adaptive weight calculation unit 110 by the line fluctuation amount ave(i)[F] outputted from the line fluctuation amount calculation unit 103.

When the movement adaptive weight is 0.0, no correction is made, and thus the line fluctuation noise cannot be reduced even though inappropriate correction due to the movement component in the image signal can be prevented. In contrast, when the movement adaptive weight w(i) is 1.0, the line fluctuation amount ave(i) is directly used for the correction of the image signal, and thus the line fluctuation noise is appropriately corrected when the subject is a stationary object. However, when the subject includes a moving object, inappropriate correction is made since line fluctuation due to the movement component in the image signal (i.e., line fluctuation other than the line fluctuation noise) is reduced.

Therefore, in this embodiment, the line fluctuation noise correction amount c_lfn(i)[F] outputted from the correction amount calculation unit 111 is calculated by using the following expression 10, for example:

$$c\_lfn(i)[F]=w(i)[F]*\text{ave}(i)[F] \qquad \text{expression 10}$$

The line fluctuation noise correction unit 112 outputs a digital signal after the correction of the line fluctuation noise, that is, the image signal Yout(i)[F] after the correction, by subtracting the line fluctuation noise correction amount c_lfn(i)[F] outputted from the correction amount calculation unit 111 from the image signal outputted from the delay unit 101. In the subtraction of the line fluctuation noise correction amount c_lfn(i)[F], it is desirable to subtract a line fluctuation noise correction amount Rc×c_lfn(i)[F] obtained by multiplying the line fluctuation noise correction amount c_lfn(i)[F] by a correction ratio Rc. If the correction ratio Rc is set at 1.0 and the correction is made 100%, offset displacement between vertical lines (horizontal stripe pattern) in an image as the reference keeps on remaining without disappearing. Thus, it is desirable to set the correction ratio Rc less than 1.0. make the correction less than 100% (leak), and thereby make the line offset in the reference image converge on the average value of the fluctuation. Letting Yout(i)[F] represent the image signal after the line fluctuation noise correction, the image signal Yout(i)[F] after the line fluctuation noise correction outputted from the line fluctuation noise correction unit 112 is calculated by using the following expression 11, for example:

$$\text{Yout}(i)[F]=\text{Yin}(i)[F]-Rc*c\_lfn(i)[F] \qquad \text{expression 11}$$

The default value of Rc is 0.875, for example. While Rc may be inputted from the outside, Rc may also be previously stored in the storage unit of the image capturing device 1.

The frame delay unit 113 performs one-frame delay in consideration of a processing delay amount so that the difference calculation can be done between the pixel value Yout(i)[F] of the image signal outputted from the line fluctuation noise correction unit 112 and a pixel at the same pixel position in the frame one frame earlier.

As described above, with the image capturing device 1 according to the first embodiment, by calculating the line fluctuation amount not regarding the whole of one horizontal scan line but regarding the partial line as a part of one horizontal scan line, the line fluctuation noise can be suppressed appropriately even when a moving object exists in the subject.

Further, by using the line fluctuation noise reduction unit 10 according to the first embodiment, the amount of the random noise is estimated by using the screen variance value average AVE_VAR[F] of one frame. Accordingly, estimation accuracy of the movement amount in one frame can be increased and an appropriate correction amount c_lfn(i)[F] according to the movement amount can be calculated.

Furthermore, by calculating the reference variance value, the movement adaptive weight property graph (shown in FIG. 5) can be modified according to the screen variance value average to a more appropriate graph suitable for the scene of the input image.

(2) Second Embodiment

Figure 6:
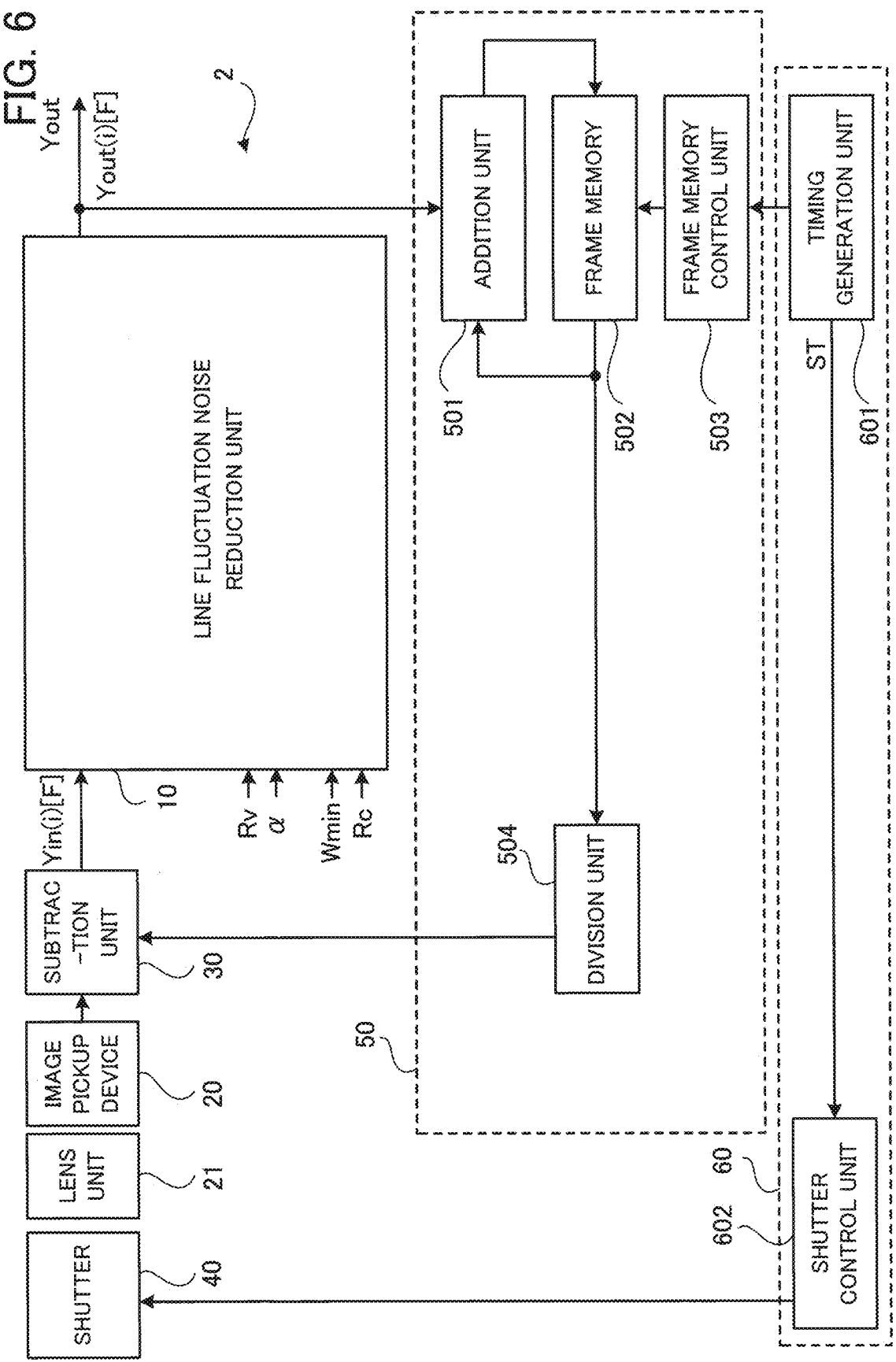
FIG. 6 is a block diagram schematically showing a configuration of an image capturing device according to a second embodiment of the present invention.

FIG. 6 is a block diagram schematically showing a configuration of an image capturing device 2 according to a second embodiment of the present invention. In FIG. 6, each component identical or corresponding to a component shown in FIG. 1 is assigned the same reference character as in FIG. 1. As shown in FIG. 6, the image capturing device 2 includes a shutter 40 that switches its state to an open state of allowing the light from the subject to pass through or a closed state of interrupting the light from the subject, a fixed pattern noise calculation unit (FPN calculation unit) 50 that calculates a fixed pattern noise (FPN) component occurring in the image pickup device 20, a control unit 60 for controlling the operation of the shutter 40, and a subtraction unit 30 that subtracts the FPN component from the image signal Yin(i)[F], in addition to the image pickup device 20, the lens unit 21 and the line fluctuation noise reduction unit 10.

The shutter 40 is arranged in front (i.e., on the subject's side) of the lens unit 21 and is used as a light transmission/interruption unit capable of switching between the open state of permitting light as a wavelength range component detectable by the image pickup device 20 (e.g., infrared rays, ultraviolet rays, visible rays, etc.) to enter the image pickup device 20 and the closed state of not permitting the light to enter. The shutter 40 may also be arranged between the lens unit 21 and the image pickup device 20. In this case, processing in consideration of the influence of the lens unit 21 is desired to be performed additionally in a correction process for removing the FPN component.

When the shutter 40 is in the open state, light radiating from the subject is condensed by the lens unit 21 and forms an image on the plurality of detection elements of the image pickup device 20. The image pickup device 20 outputs pixel values, at levels corresponding to the intensity of the light entering the plurality of detection elements, successively (e.g., in the order of the raster scan) as the image signal. The image signal outputted from the image pickup device 20 when the shutter 40 is in the open state includes not only a signal component as a component corresponding to the light radiating from the subject but also the FPN component and a variation component caused by variations in the peak value of the vertical drive pulse applied to the drive wires of the image pickup device 20.

When the shutter 40 is in the closed state, the entry of the light into the image pickup device 20 is interrupted. In this closed state, the image signal outputted from the image pickup device 20 does not include the signal component and includes only the FPN component and the component caused by the variations in the peak value of the vertical drive pulse.

The control unit 60 is, for example, a control circuit including a timing generation unit 601 and a shutter control unit 602. The FPN calculation unit 50 is, for example, a processing circuit including an addition unit 501, a frame memory 502 as a storage unit, a frame memory control unit 503, and a division unit 504.

The timing generation unit 601 outputs an operation mode signal ST as a timing signal indicating whether the image capturing device 2 is in an update mode for updating a correction value based on a noise component such as the FPN component or in a normal image capturing mode for capturing images of a subject. The shutter control unit 602 performs control for switching the shutter 40 to the open state (at times of the normal image capturing mode) or the closed state (at times of the update mode) according to the operation mode signal ST outputted from the timing generation unit 601.

The image capturing device 2 sets its operation mode to the update mode when the power of the image capturing device 2 is turned on and when the user commanded the update mode through an operation input unit (not shown). For example, when the timing generation unit 601 sets the operation mode signal ST at a low level that is lower than a normal level, the shutter control unit 602 sets the shutter 40 in the closed state and the frame memory control unit 503 executes control for performing the writing to the frame memory 502, that is, for updating the value of the FPN component stored in the frame memory 502.

The FPN calculation unit 50 calculates the FPN component included in the image signal outputted from the image pickup device 20, holds the result of the calculation, and outputs a signal corresponding to the held FPN component.

When the operation mode signal ST indicates the update mode for commanding the update of the FPN component stored in the frame memory 502, the shutter 40 is in the closed state and the image signals Yout(i)[F] outputted from the line fluctuation noise correction unit 112 in the line fluctuation noise reduction unit 10 are added up by the addition unit 501 for a predetermined frame number of frames (e.g., 64 frames) and the totalized image signal obtained by the addition is stored in the frame memory 502. The division unit 504 reads out the totalized image signal from the frame memory 502, divides each pixel value in the totalized image signal by the predetermined frame number, and supplies the subtraction unit 30 with the result of the division as the FPN component.

When the operation mode signal ST indicates the normal image capturing mode, the shutter 40 is in the open state and the division unit 504 reads out the totalized image signal from the frame memory 502, divides each pixel value in the totalized image signal by the predetermined frame number, and supplies the subtraction unit 30 with the result of the division as the FPN component. The number of frames added up may also be determined arbitrarily by the user based on character or amplitude of the random noise.

The addition unit 501 adds the signal read out from the frame memory 502 and the image signal Yout(i)[F] outputted from the line fluctuation noise correction unit 112 together and stores the result of the addition in the frame memory 502.

When the operation mode signal ST outputted from the timing generation unit 601 indicates the update mode, the frame memory control unit 503 repeats the operation of storing the addition result outputted from the addition unit 501 in the frame memory 502 for the predetermined frame number, and stops the storing of the addition result in the frame memory 502 when the result of the repetition of the addition for the predetermined frame number is stored in the frame memory 502.

The division unit 504 divides each pixel value in the image signal outputted from the frame memory 502 by the same value as the number of frames added up. The division unit 504 provides the subtraction unit 30 with the result of the division as an input signal. The subtraction unit 30 is used for the difference calculation of calculating the difference from the image signal in the next frame.

As described above, with the image capturing device 2 according to the second embodiment, the following advantage is obtained in addition to the advantages obtained with the image capturing device 1 according to the first embodiment.

With the image capturing device 2, by providing the shutter 40, the line fluctuation noise can be suppressed appropriately since the image signal from which the FPN component has been removed is inputted to the line fluctuation noise reduction unit 10.

Incidentally, in the second embodiment, the removal of the FPN is performed first and thereafter the removal of the line fluctuation noise is performed. However, it is also possible to employ a configuration for performing the removal of the line fluctuation noise first and thereafter performing the removal of the FPN depending on character and amplitude of each of the FPN and the line fluctuation noise and the number of bits or a signal dynamic range assigned to the processing performed by the correction unit in regard to each of the FPN and the line fluctuation noise.

(3) Third Embodiment

In the above-described first and second embodiments, the description was given of a case where the signal inputted to the line fluctuation noise reduction unit 10 is the image signal outputted from the image pickup device 20 including a plurality of detection elements for detecting light as an electromagnetic wave at an arbitrary wavelength. However, it is also possible to employ a detection unit including a plurality of detection elements arranged two-dimensionally for measuring the temperature of a detection target or a detection unit including a plurality of detection elements arranged two-dimensionally for measuring the distance to a detection target (and consequently measuring the shape of the surface of the detection target) instead of the image pickup device 20 for capturing images of the subject. The pixel values obtained by capturing an image of the subject as the detection target, the temperature at each position on the detection target, and the distance to each position on the detection target are examples of a physical quantity of the detection target.

Figure 7:
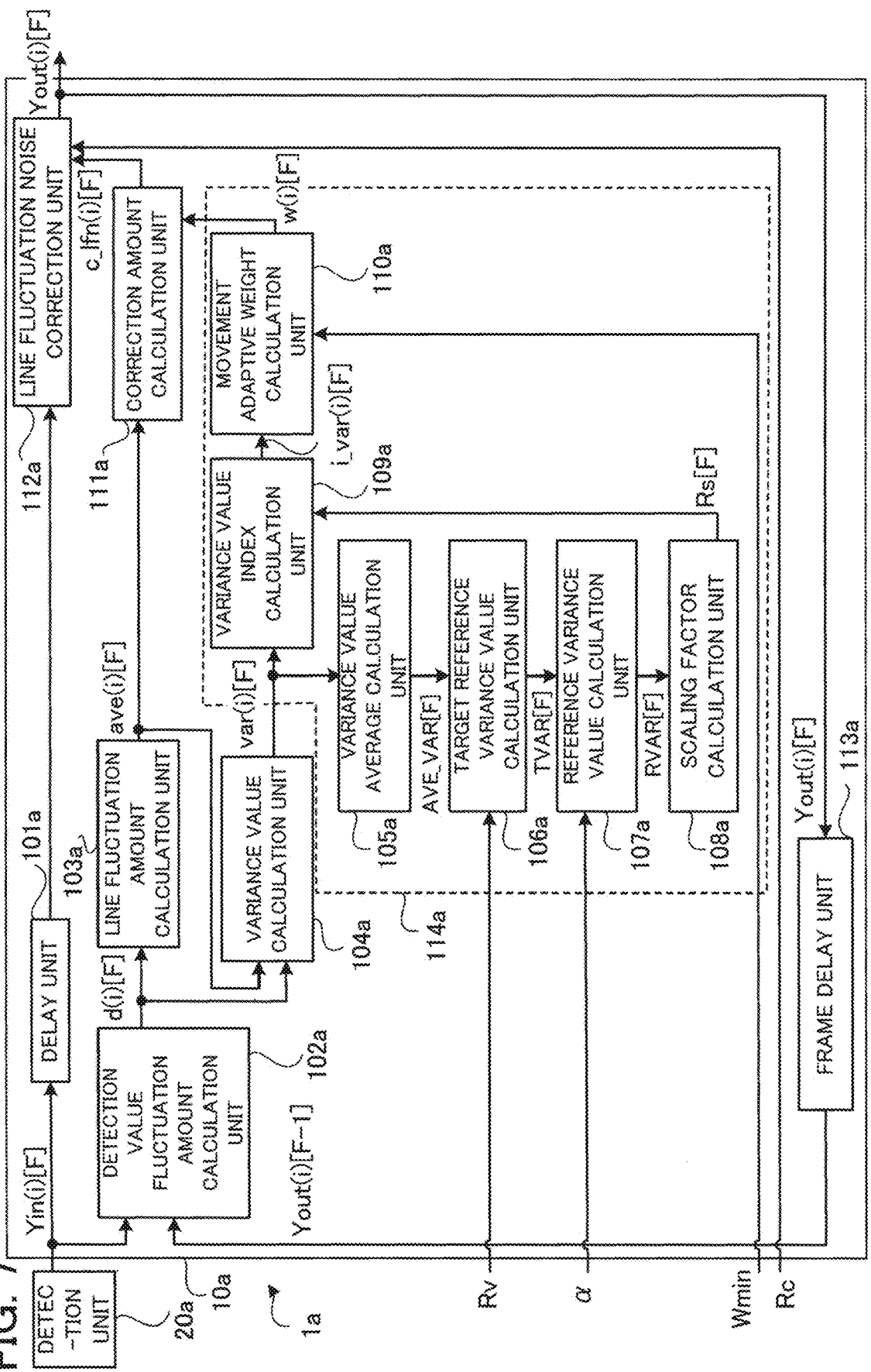
FIG. 7 is a block diagram schematically showing a configuration of a line fluctuation noise reduction device according to a third embodiment of the present invention.

FIG. 7 is a block diagram schematically showing a configuration of a detection device 1a and a line fluctuation noise reduction 10a as a line fluctuation noise reduction unit according to a third embodiment of the present invention. As shown in FIG. 7, the detection device 1a according to the third embodiment includes a detection unit 20a and the line fluctuation noise reduction device 10a.

The detection unit 20a includes a plurality of detection elements arranged two-dimensionally similarly to the image pickup device 20 in the first and second embodiments. The plurality of detection elements detects a physical quantity such as the temperature of the detection target or the distance to the detection target. The detection unit 20a outputs a plurality of detection values corresponding to the plurality of detection elements as a detection signal.

The line fluctuation noise reduction device 10a performs a correction process similar to the correction process of the line fluctuation noise reduction unit 10 in the first or second embodiment.

The line fluctuation noise reduction device 10a includes a delay unit 101a, a detection value fluctuation amount calculation unit 102a, a line fluctuation amount calculation unit 103a, a variance value calculation unit 104a, a variance value average calculation unit 105a, a target reference variance value calculation unit 106a, a reference variance value calculation unit 107a, a scaling factor calculation unit 108a, a variance value index calculation unit 109a, a movement adaptive weight calculation unit 110a, a correction amount calculation unit 111a, a line fluctuation noise correction unit 112a and a frame delay unit 113a. The variance value average calculation unit 105a, the target reference variance value calculation unit 106a, the reference variance value calculation unit 107a, the scaling factor calculation unit 108a, the variance value index calculation unit 109a and the movement adaptive weight calculation unit 110a constitute a movement adaptive weight determination unit 114a.

The delay unit 101a, the detection value fluctuation amount calculation unit 102a, the line fluctuation amount calculation unit 103a, the variance value calculation unit 104a, the variance value average calculation unit 105a, the target reference variance value calculation unit 106a, the reference variance value calculation unit 107a, the scaling factor calculation unit 108a, the variance value index calculation unit 109a, the movement adaptive weight calculation unit 110a, the correction amount calculation unit 111a, the line fluctuation noise correction unit 112a, the frame delay unit 113a and the movement adaptive weight determination unit 114a in the third embodiment respectively perform processing similarly to the delay unit 101, the pixel value fluctuation amount calculation unit 102, the line fluctuation amount calculation unit 103, the variance value calculation unit 104, the screen variance value average calculation unit 105, the target reference variance value calculation unit 106, the reference variance value calculation unit 107, the scaling factor calculation unit 108, the variance value index calculation unit 109, the movement adaptive weight calculation unit 110, the correction amount calculation unit 111, the line fluctuation noise correction unit 112, the frame delay unit 113 and the movement adaptive weight determination unit 114 in the first or second embodiment.

As described above, by using the line fluctuation noise reduction device 10a according to the third embodiment, the line fluctuation noise can be suppressed appropriately even when a moving object exists in the detection target.

Further, by using the line fluctuation noise reduction device 10a according to the third embodiment, the amount of the random noise is estimated by using the variance value average AVE_VAR[F] of one frame. Accordingly, the estimation accuracy of the movement amount in one frame can be increased and an appropriate correction amount c_lfn(i)[F] according to the movement amount can be calculated.

Except for the above-described features, the line fluctuation noise reduction device 10a according to the third embodiment is the same as the line fluctuation noise reduction unit 10 according to the first or second embodiment.

(4) Modification

Figure 8:
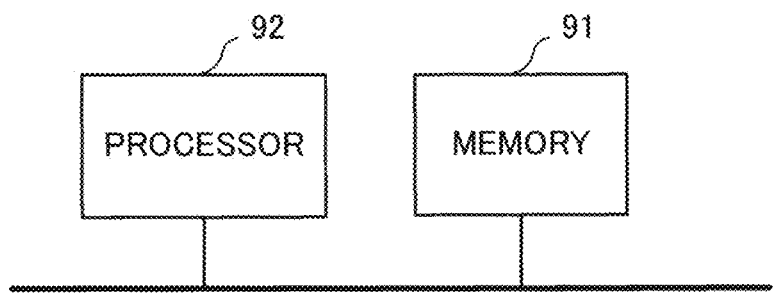
FIG. 8 is a diagram schematically showing a hardware configuration of a modification of the first to third embodiments.

FIG. 8 is a diagram schematically showing an example of a hardware configuration of the line fluctuation noise reduction unit in the first or second embodiment or the line fluctuation noise reduction device according to the third embodiment. The line fluctuation noise reduction unit 10 shown in FIG. 1 or the line fluctuation noise reduction device 10a shown in FIG. 7 can be implemented by using a memory 91 as a storage device storing a program as software and a processor 92 as an information processing unit executing the program stored in the memory 91 (e.g., by a computer). It is also possible to implement part of the line fluctuation noise reduction unit 10 shown in FIG. 1 or the line fluctuation noise reduction device 10a shown in FIG. 7 with the memory 91 shown in FIG. 8 and the processor 92 executing a program.

DESCRIPTION OF REFERENCE CHARACTERS 1, 2: image capturing device, 10: line fluctuation noise reduction unit (line fluctuation noise reduction device), 20: image pickup device (image capturing unit), 21: lens unit, 30: subtraction unit, 40: shutter, 50: fixed pattern noise calculation unit, 60: control unit, 101: delay unit, 102: pixel value fluctuation amount calculation unit, 103: line fluctuation amount calculation unit, 104: variance value calculation unit, 105: screen variance value average calculation unit, 106: target reference variance value calculation unit, 107: reference variance value calculation unit, 108: scaling factor calculation unit, 109: variance value index calculation unit, 110: movement adaptive weight calculation unit, 111: correction amount calculation unit, 112: line fluctuation noise correction unit, 113: frame delay unit, 114: movement adaptive weight determination unit, 501: addition unit, 502: frame memory, 503: frame memory control unit, 504: division unit, 601: timing generation unit, 602: shutter control unit, 10a: line fluctuation noise reduction device, 20a: detection unit, 101a: delay unit, 102a: detection value fluctuation amount calculation unit, 103a: line fluctuation amount calculation unit, 104a: variance value calculation unit, 105a: variance value average calculation unit, 106a: target reference variance value calculation unit, 107a: reference variance value calculation unit, 108a: scaling factor calculation unit, 109a: variance value index calculation unit, 110a: movement adaptive weight calculation unit, 111a: correction amount calculation unit, 112a: line fluctuation noise correction unit, 113a: frame delay unit.

What is claimed is:
1. An image capturing device comprising:
an image sensor that includes a plurality of detection elements arranged two-dimensionally in a horizontal scan direction and a vertical direction, captures an image of a subject, and thereby outputs pixel values of a plurality of pixels corresponding to the plurality of detection elements; and
processing circuitry configured to:
calculate a pixel value fluctuation amount as a fluctuation amount of each of the pixel values in a time direction;
calculate a line fluctuation amount as an average value of N pixel value fluctuation amounts of N pixels in a partial line where N is an integer smaller than a total number of pixels in a horizontal scan line and the partial line is a range of N consecutive pixels in the horizontal scan line;
calculate a variance value of the N pixel value fluctuation amounts from the N pixel value fluctuation amounts and the line fluctuation amount;
calculate a movement adaptive weight based on the variance value;
calculate a line fluctuation noise correction amount, corresponding to each of the pixel values outputted from the image sensor, from the line fluctuation amount and the movement adaptive weight; and
correct each of the pixel values outputted from the image sensor by using the line fluctuation noise correction amount and thereby to generate an image signal after the correction.
2. The image capturing device according to claim 1, wherein the processing circuitry is further configured to:

calculate a variance value index as a value corresponding to the variance value; and calculate the movement adaptive weight so that the movement adaptive weight decreases with an increase in the variance value index when the variance value index is in a range greater than or equal to a predetermined first threshold value and less than or equal to a predetermined second threshold value.

3. The image capturing device according to claim 1, wherein the processing circuitry is further configured to:

calculate a screen variance value average as a screen average of the variance values;

obtain a reference variance value by performing exponential smoothing on the screen variance value average in a time direction;

calculate a variance value index by multiplying the variance value by a scaling factor based on the reference variance value; and calculate the movement adaptive weight so that the movement adaptive weight decreases with an increase in the variance value index when the variance value index is in a range greater than or equal to a predetermined first threshold value and less than or equal to a predetermined second threshold value.

4. The image capturing device according to claim 3, wherein the processing circuitry is further configured to calculate the scaling factor by dividing a predetermined standard reference variance value by the reference variance value.

5. The image capturing device according to claim 2, wherein the processing circuitry is further configured to:

set the movement adaptive weight at a predetermined first value when the variance value index is less than or equal to the first threshold value, and set the movement adaptive weight at a predetermined second value smaller than the first value when the variance value index is greater than or equal to the second threshold value.

6. The image capturing device according to claim 5, wherein the first value is 1.0, the second value is 0.0, and the movement adaptive weight takes on a value from 1.0 to 0.0 when the variance value index is in a range greater than or equal to the first threshold value and less than or equal to the second threshold value.

7. The image capturing device according to claim 1, wherein the processing circuitry is further configured to repeat the process of calculating the line fluctuation amount regarding each partial line each time the partial line is moved in a direction of the horizontal scan line by one pixel.

8. The image capturing device according to claim 1, wherein the processing circuitry repeat the process of calculating the line fluctuation amount regarding each partial line each time the partial line is moved in a direction of the horizontal scan line by N pixels.

9. The image capturing device according to claim 1, wherein the processing circuitry is further configured to output the image signal after the line fluctuation noise correction by subtracting the line fluctuation noise correction amount from the pixel value of an inputted image signal, or by subtracting a value obtained by multiplying the line fluctuation noise correction amount by a correction ratio less than 1 from the pixel value of the inputted image signal.

10. The image capturing device according to claim 1, wherein the processing circuitry is further configured to calculate a fluctuation amount between the pixel value of the pixel in a reference frame and the pixel value of the same pixel in a frame one frame earlier than the reference frame as the pixel value fluctuation amount.

11. The image capturing device according to claim 1, wherein the image sensor detects light in a predetermined wavelength range.

12. The image capturing device according to claim 1, wherein the processing circuitry is further configured to:

calculate a fixed pattern noise component occurring in the image sensor; and subtract the fixed pattern noise component from the image signal outputted from the image sensor.

13. A line fluctuation noise reduction device that receives a detection signal outputted from a detector including a plurality of detection elements arranged two-dimensionally in a horizontal scan direction and a vertical direction, detecting a physical quantity of a detection target, and thereby outputting detection values of a plurality of detection points corresponding to the plurality of detection elements, the line fluctuation noise reduction device comprising processing circuitry configured to:

calculate a detection value fluctuation amount as a fluctuation amount of each of the detection values in a time direction;

calculate a line fluctuation amount as an average value of N detection value fluctuation amounts of N detection points in a partial line where N is an integer smaller than a total number of detection points in a horizontal scan line and the partial line is a range of N consecutive detection points in the horizontal scan line;

calculate a variance value of the N detection value fluctuation amounts from the N detection value fluctuation amounts and the line fluctuation amount;

calculate a movement adaptive weight based on the variance value;

calculate a line fluctuation noise correction amount, corresponding to each of the detection values outputted from the detector, from the line fluctuation amount and the movement adaptive weight; and correct each of the detection values outputted from the detector by using the line fluctuation noise correction amount and thereby to generate the detection signal after the correction.

14. The line fluctuation noise reduction device according to claim 13, wherein the detection signal has detection values based on a temperature of the detection target detected by the plurality of detection elements of the detector.

15. The line fluctuation noise reduction device according to claim 13, wherein the detection signal has detection values based on a distance to the detection target detected by the plurality of detection elements of the detector.

* * * * *